Aug. 16, 1966 — L. J. BUDD — 3,266,188
PLANT SHIPPER AND SHELTER
Filed June 6, 1963 — 3 Sheets-Sheet 3

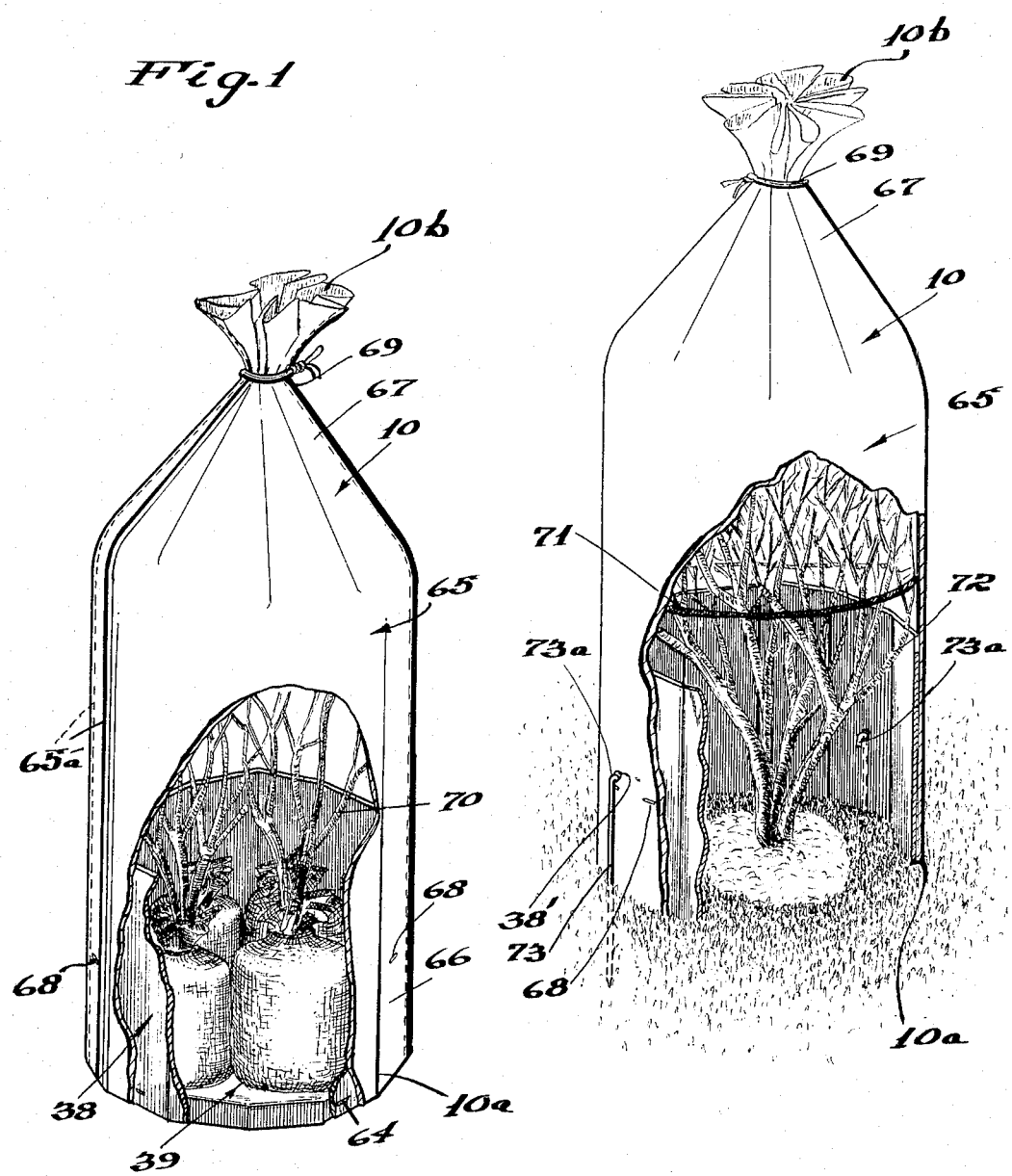

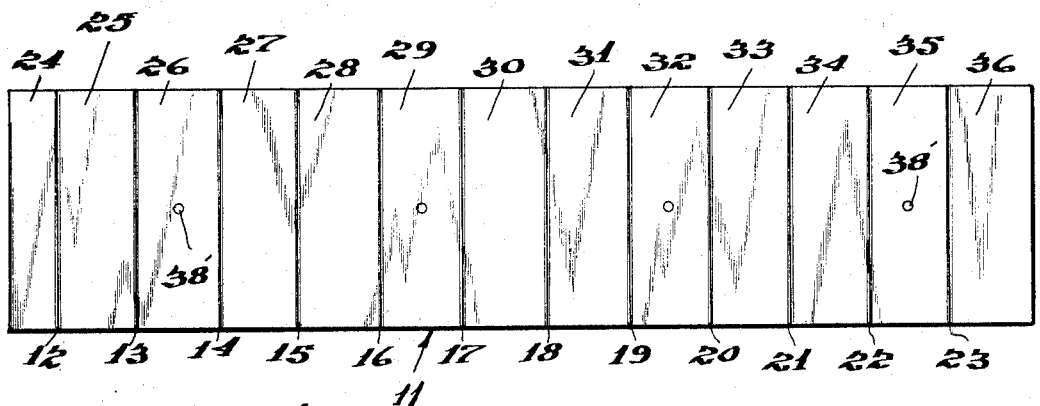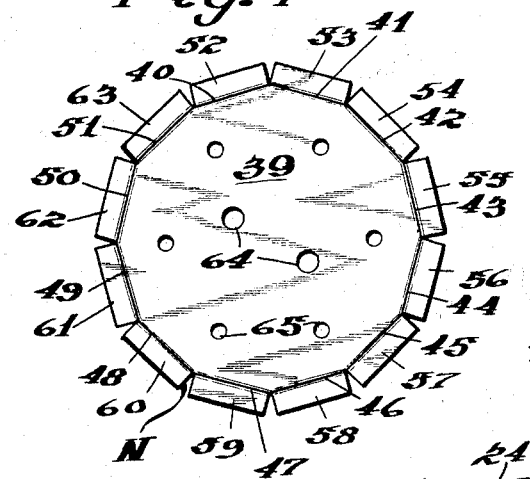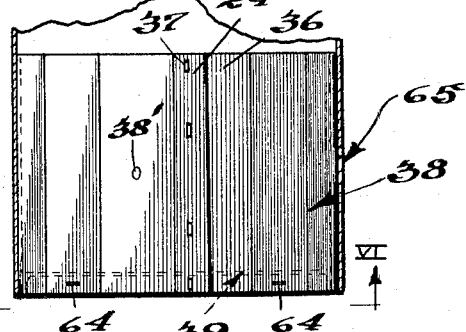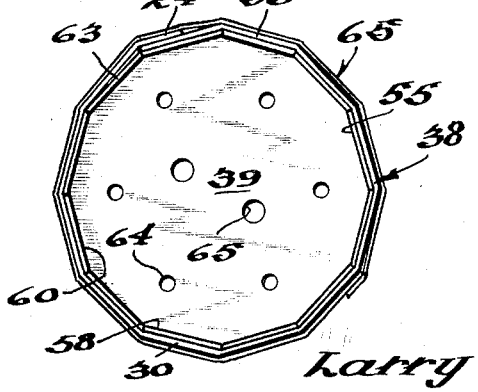

INVENTOR.
Larry J. Budd
BY
Hill, Sherman, Meroni, Gross & Simpson
ATTORNEYS

United States Patent Office 3,266,188
Patented August 16, 1966

3,266,188
PLANT SHIPPER AND SHELTER
Larry J. Budd, Elmhurst, Ill., assignor to Pallet Devices, Inc., Des Plaines, Ill., a corporation of Illinois
Filed June 6, 1963, Ser. No. 285,978
5 Claims. (Cl. 47—28)

The present invention relates generally to a plant container which may be used as a plant shelter and as a plant shipping container, as desired. The present invention further relates to a new and improved method of manufacturing a container of the foregoing type.

Experiments have been conducted by me in an effort to develop a plant shelter that can be reasonably manufactured and which will efficiently function to protect plants that require protection from severe weather conditions. The present invention is at least partially concerned with a new and improved plant shelter. I have found that where paper and corrugated paperboard materials are used in the construction of plant shelters, that such materials have a tendency to weaken due to the collection of snow on the top side of flat-top types of shelters. According to my invention, I have developed a reinforced plant shelter comprised of paper materials and which is constructed so as to have a generally cone-shaped closed upper end which resists the tendency for snow to accumulate thereon. The shelter includes a reinforced tube and a paper tube which has a length substantially greater than the length of the reinforced tube. The reinforced tube is secured with one end of the paper tube to provide the shelter with a reinforced ground-engaging end. The tubes are telescoped over a plant and an upper end of the paper tube is held closed over an upper end of a plant, enclosed within the shelter, by means of a suitable fastener such as a length of wire. The reinforced lower end of the shelter is anchored to the ground around the plant by means of a series of hooks or stakes.

According to other important features of my invention, my container can also be used as a plant shipper by securing a bottom or a platform with the reinforced lower end of the container. Plants can be supported on such bottom or platform internally of the container.

According to certain method features of my invention, the plant container can be manufactured by cutting a shelter wall blank from corrugated paperboard material and providing transversely extending score lines at spaced intervals along the length of the wall blank. The wall blank is then folded so as to dispose opposite ends in lapped relationship whereupon they are secured together. The blank of waterproof paper is then sized to shape and folded to dispose opposite ends of the paper blank in lapped relation whereupon the lapped edges are secured to form a flat-shaped paper tube having a length greater than the length of the corrugated tube. The flat-shaped corrugated tube is then telescoped inside of the flat-shaped paper tube, and the tubes are secured together. Unsupported areas of the paper tubes may then be wrapped around the corrugated tube to compact the container for shipment and for storage.

According to other important method features of my invention, the container may be adapted for use as a plant shipper by expanding the side walls of the flat-shaped paper and corrugated tubes and inserting a polysided bottom or platform inside of the tubes in secured assembly therewith.

In view of the foregoing description, it will now be appreciated that it is an important object of my invention to provide a new and improved plant container which may be used as a shipper or a shelter, as desired.

Yet another important object of this invention is to provide a new and improved method for manufacturing a plant container which may be used as a plant shipper or as a plant shelter, as desired.

Still another important object of this invention is to provide a new and improved plant shelter which is capable of withstanding severe weather conditions in an improved manner.

Other objects and features of this invention will more fully become apparent in view of the following detailed description taken in conjunction with the accompanying drawings illustrating therein a single embodiment and in which:

FIGURE 1 is an enlarged perspective view with parts broken away of a plant container here adapted for use as a plant shipper;

FIGURE 2 is an enlarged perspective view with parts broken away of a plant container illustrated for use as a plant shelter;

FIGURE 3 is a layout view of a blank for use as a reinforcing tube in my container;

FIGURE 4 is a plan view of a bottom or platform in assembly within the reinforced tube where the container is to be used as a plant shipper;

FIGURE 5 is a side view of reinforced tube having a bottom mounted therein;

FIGURE 6 is a bottom view of the reinforced tube as shown on the line VI—VI looking in the direction indicated by the arrows in FIGURE 5;

As shown on the drawings:

Figure 7:
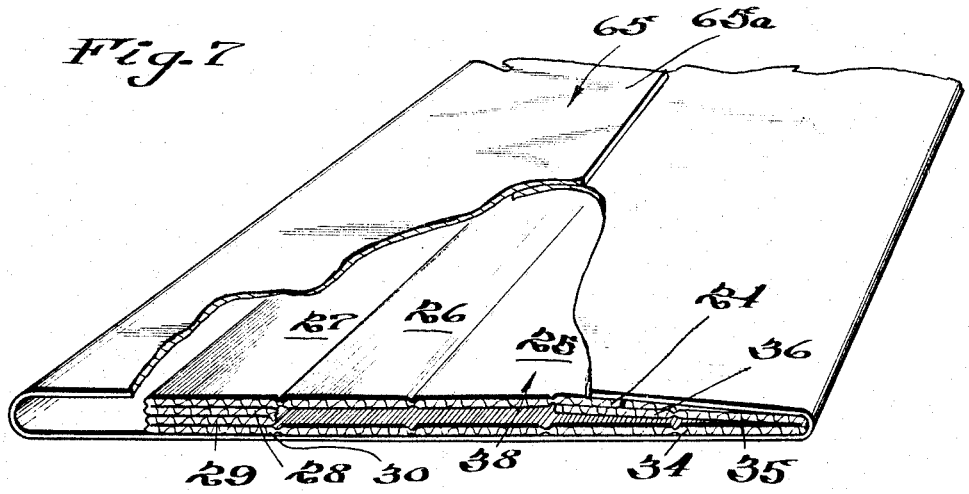
FIGURE 7 is a perspective view illustrating the manner in which the components of my container may be assembled.

The reference numeral 10 indicates generally a plant container which may be used as a plant shipper and/or as a plant shelter. When the container 10 is used as a plant shipper, the container will appear as illustrated in FIGURE 1. Where the container is to be used as a plant shelter the container will appear as illustrated in FIGURE 2.

The container 10 includes a component which is formed from a sheet or blank of corrugated paperboard 11 as illustrated in FIGURE 3. The sheet or blank 11 is initially sized to shape and scored at longtiudinally spaced intervals as designated by the score lines 12–23, inclusive, to form reinforced tube sides 24–36, inclusive. As illustrated, I have provided a blank 11 that is adapted to be folded into the shape of a dodecahedron when assembled. The number of tube sides may be varied depending on the ultimate tube shape desired.

The tube sides 24 and 36 are adapted to be disposed in lapped relation and secured by any suitable means such as staples 37 (FIGURE 5) and the like to form a multi-sided corrugated or reinforced paperboard tube 38.

The blank 11 may also be preformed with a series of stake or hook holes 38' for reasons which will be further discussed hereafter.

Another component of the container 10 is a paper or flexible tube 65 which is preferably formed from a weather resistant type paper and which may be resin coated, wax coated or the like. The tube 65 may be formed by lapping opposite ends 65a of a length of paper in lapped relation and by securing the lapped ends by suitable means such as a non-soluble glue, staples or the like.

The tubes 38 and 65 may be assembled while in essentially flat form. A pair of the tube side walls such as tube side walls 28 and 29 may be folded along the respective score lines in such a way so as to project into the interior of the tube 38 in lapped relation to another pair of the tube sides such as tube sides 27 and 30. By folding the tube sides of the tube 38 in this manner, the reinforced tube may be telescoped inside paper tube 65. The paper tube may be disposed in an essentially flat form also for receipt of the reinforced tube 38, as shown in FIGURE 7.

Figure 8:
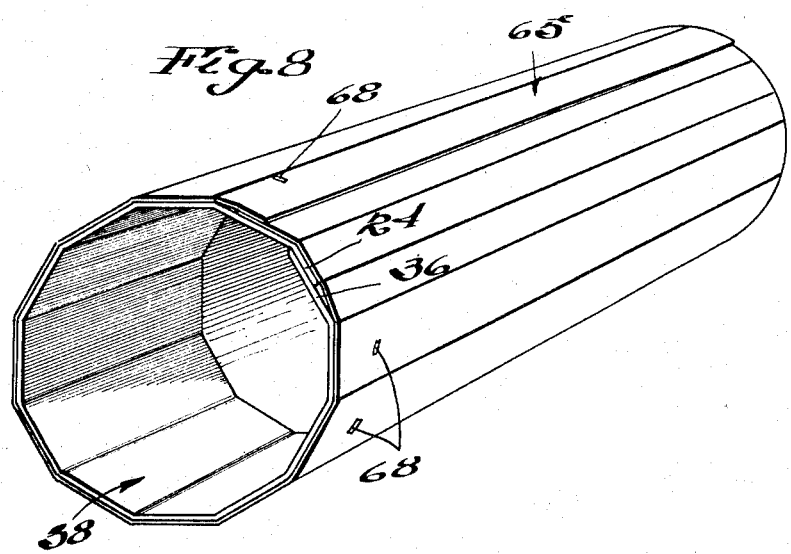
FIGURE 8 is a perspective view of the container components shown in FIGURE 7 only illustrated in assembled relation.

In order to further assemble the tubes, the inturned reinforced tube flaps 28 and 29 may then be pushed out towards the paper tube while the reinforced tube sides are folded at the respective score lines to form a tubular-shaped plant container as seen in FIGURE 8. The tubes 38 and 65 may be secured together in any suitable way such as by means of staples 68 and the like.

Where the container 10 is to be employed as a plant shipper, as shown in FIGURE 1, a bottom or platform 39 is secured with the tubes 38 and 65 by suitable means such as staples 64 and the like. The bottom or platform 39 is cut from a sheet of reinforced paperboard and scored along score lines 42–51, inclusive, so that the bottom 39, when assembled with the container 10, will snugly engage with the tube sides of the reinforced tube 38. In order to attach the platform 39 with the tubes 38 and 65, and in order to further support articles such as plants or bushes 70 within the container 10, the bottom 39 is formed with a series of bottom or platform legs 52–63 (FIGURE 4) inclusive. During the formation of the bottom member 39, it will be appreciated that the blank is notched as indicated at N in order to separate the flaps or tube legs 52–63 from one another. The notches N are each of generally a triangular configuration. The bottom 39 is further cut or formed so as to be provided with a pair of finger holes 64, and a series of vent holes 65 as shown in FIGURE 4.

As previously discussed, where the container 10 is to be used as a plant shipper, the bottom 39 is inserted interiorly of the tubes 38 and 65 at a lower end thereof. The bottom 39 is attached with the tubes by folding the bottom or platform legs along the respective score lines to dispose the legs in normal relation to the bottom or platform 39 whereupon the bottom or platform legs will be aligned so as to be flush with bottom edges of the tubes 38 and 65 before the legs are attached with the tubes by the staples 64 or other suitable means.

After the bushes or plants 70 have been loaded into the container 10 and mounted on the bottom of platform 39, the container 10 may be closed by reducing the cross-sectional configuration of the upper end of the paper tube 65 and securing the thus reduced end by means of a suitable fastener such as a length of wire or string, as designated at 69 in FIGURE 1. After the upper end of the tubes have been closed, it will be noted that the upper end of the paper tube 65 assumes a generally cone shape, as indicated at 67 in FIGURE 1.

Where the container 10 is to be used as a plant shelter, the platform 39 is not needed. If a party buys a number of plants which are shipped to him in the plant container, the party may remove the plants from the container 10 and also remove the bottom 39 so that the container can be mounted over the plants when planted, to enable the container to serve as a plant shelter, as shown in FIGURE 2. Ordinarily, where a large size bush, such as a rose bush 72 is to be covered, the branches of the bush may be tied and held in a more compact form by means of a wire or string as shown in FIGURE 2. The tubes 38 and 65 may then be mounted over the rose bush 72 and staked to the ground by a series of hooks or stakes 73. The stakes or hooks 73 are each provided with hooked ends 73a which are adapted to be engaged within the stake or hook holes 38' which project from the tubes 38 and 65. The stakes 73 are of sufficient length so that they may be pushed into the ground a sufficient distance to firmly anchor the plant shelter to the ground at the perimeter of the bush. Excellent results may be obtained in the installation of my plant shelter 10 by assembling the hooked ends 73 within the holes 38' before the lower end of the container 10 is engaged with the ground. As the container is guided over the bush 72, the stakes 73 may be manually grasped and pushed into the ground causing the stakes to firmly anchor the tubes against the supporting ground surface. Three or more stakes may be employed as desired.

After the plant shelter 10 has been staked to the ground, the upper end of the paper tube 65 is closed with the wire strand 69 and thereby formed into generally the shape of a cone as indicated at 67. The plant shelter 10 is provided with a cone-shaped upper end in order to minimize snow accumulation on top of the shelter during winter seasons and to prevent collapse of the tubes 38 and 65.

According to my method of forming the container 10 and of packaging plants 70 or of protectively encasing previously planted plants such as the plant 72, the reinforcing tube 38 and the flexible tube 65 are formed to shape and assembled together as shown in FIGURES 7 and 8 as previously described. Where the container 10 is to be used as a plant shelter, holes are cut into the paper tube 65 in alignment with the holes 38' in the rigid tube 38 so that the hooked ends 73a of the stakes 73 may be retainingly secured with the tubes. Thereafter, the plant 72 is tied with the wire or string 71 and the shelter 10 is installed in position in the manner previously described. The method of assembly of the container 10 where used as a shipper, differs from that of the container 10 where used as a plant shelter in that the platform 39 is installed and secured in assembly with the rigid and flexible tubes by means of the staples 64 projected through the bottom legs or leg flaps 52–63.

Figure 9:
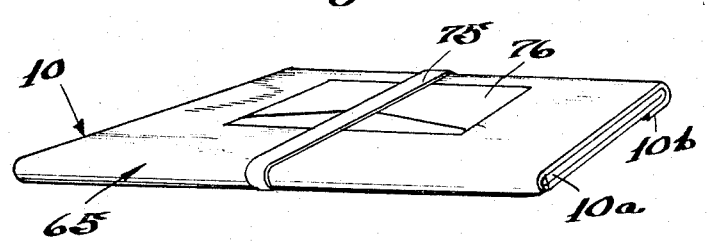
FIGURE 9 is a perspective view of my container when in a knockdown state.

The container 10 can be conveniently shipped to a user by shipping the tubes in a flat form, as shown in FIGURE 9. The unsupported portions of the flexible tube 65 are wrapped endwise around the reinforced end of the container and secured in wrapped position by a removable-type tape or strap 75 (FIGURE 9). A bag 76 may be secured with the container 10 while in a flat form and held in assembly therewith by means of the tape or strap 75. The hooks or stakes 73, as well as the wire 69 and the twine 71, may all be placed into the pouch or bag 76 for ready use by the consumer. The platform 39 can be carried on the underside of the folded package 10 shown in FIGURE 9 by means of the strap 75, also.

When the bag 10 is in folded form, lower bag end 10a is disposed in the interior of the folded bag while upper bag end 10b is disposed at the exterior of the folded container 10.

Although minor modifications might be suggested by those versed in the art, it should be understood that I wish to embody within the scope of the patent warranted hereon, all such modifications as reasonably and properly come within the scope of my contribution to the art.

I claim as my invention:
1. A plant shelter comprising,
   a multi-sided corrugated paperboard tube,
   a weather resistant flexible paper tube enveloping the multi-sided corrugated paperboard tube with an upper end of said paper tube extended above said paperboard tube,
   means for securing the paper tube to the multi-sided corrugated paperboard tube for supporting a lower end of said paper tube,
   the paper tube and the multi-sided corrugated paperboard tube having aligned openings,
   ground stakes having hook shaped ends engaged in said openings of said tubes about the perimeter of the plant shelter with the ground stakes having opposite ends extended beneath the shelter for securing the plant shelter to a ground surface, and
   means for holding said upper end of said paper tube closed and generally in the shape of a tapered mem- ber having a peak so as to reduce any tendency for snow to accumulate thereon.

2. A plan shelter comprising, a multi-sided open ended corrugated paperboard tube, a weather resistant flexible paper tube enveloping the multi-sided corrugated paperboard tube with an upper end of said paper tube extended above said paperboard tube, means for securing the paper tube with the multi-sided corrugated paperboard tube for supporting a lower end of said paper tube, ground stakes disposable about the perimeter of the plant shelter having means for attachment with said tubes, and means for holding said upper end of said paper tube closed and tapered to a peak so as to reduce any tendency for snow to accumulate thereon and with said paper tube including its upper end being of sufficient strength to be self-supporting when in combination with said multi-sided corrugated paper board tube while the paper board tube is in an expanded position for enclosing a plant.

3. A knockdown collapsible plant shelter which includes a multi-sided corrugated paperboard tube comprising a sheet having side edges secured in lapped relation and with the tube being in flat form, the sheet having transversely spaced score lines disposed in parallel relation defining the sides, a weather resistant flexible tube enveloping the multi-sided corrugated paperboard tube with an end of said weather resistant tube extended beyond said paperboard tube and wrapped in flat form over at least one of the ends of said multi-sided corrugated paperboard tube, said weather resistant tube comprising a piece of material having a length in excess of the length of said paperboard tube and having side edges secured in lapped relation, means for securing the weather resistant tube with the multi-sided corrugated paperboard tube in telescoped relation leaving one end of said flexible tube free of said paperboard tube whereby said collapsed plant shelter may be expanded to form a plant shelter, and means for holding said upper end of said weather resistant tube closed and tapered to a peak so as to reduce any tendency for snow to accumulate thereon and with said flexible tube including its upper end being of sufficient strength to be self-supporting when in combination with said multi-sided corrugated paper board tube while the paper board tube is in an expanded position for enclosing a plant.

4. A knockdown collapsible plant shelter which includes a multi-sided corrugated paperboard tube comprising a sheet having side edges secured in lapped relation and with the tube being in flat form, the sheet having transversely spaced score lines disposed in parallel relation defining the sides, a flexible weather resistant tube enveloping the multi-sided corrugated paperboard tube with an end of said weather resistant tube extended beyond said paperboard tube and wrapped in flat form over at least one of the ends of said multi-sided corrugated paperboard tube, said flexible weather resistant tube comprising a piece of material having a length in excess of the length of said paperboard tube and having side edges secured in lapped relation, means for securing the flexible weather resistant tube with the multi-sided corrugated paperboard tube in telescoped relation leaving one end of said paper tube free of said paperboard tube, means for holding said upper end of said flexible weather resistant tube closed and tapered to a peak so as to reduce any tendency for snow to accumulate thereon and with said flexible weather resistant tube including its upper end being of sufficient strength to be self-supporting when in combination with said multi-sided corrugated paper board tube while the paper board tube is in an expanded position for enclosing a plant, and means for holding the thus folded and collapsed tubes in compact assembly.

5. The shelter of claim 2 further characterized by said tubes being collapsible into flat form with the paper tube being foldable over said paperboard tube to enable said shelter to be shipped in compact form.

References Cited by the Examiner

UNITED STATES PATENTS

| | | | |
|---|---|---|---|
| 81,693 | 9/1868 | Shepard | 47—30 |
| 327,510 | 10/1885 | Anderson | 47—28 |
| 778,688 | 12/1904 | Marsh | 47—28 |
| 893,759 | 7/1908 | Thomas | 229—55 |
| 1,485,924 | 3/1924 | Hobbs | 47—31 |
| 1,701,797 | 2/1929 | Schindler | 47—28 |
| 1,828,301 | 10/1931 | Davis | 47—30 |
| 1,923,677 | 8/1933 | Lovett | 47—34.11 |
| 1,988,886 | 1/1935 | Wilson | 47—37.3 |
| 2,004,396 | 6/1935 | Sage | 93—1 |
| 2,256,414 | 9/1941 | Stahl | 47—28 |
| 2,341,374 | 2/1944 | Gardner | 47—37.3 |
| 2,665,523 | 1/1954 | Hardman | 47—28 |
| 2,678,768 | 5/1954 | Vergobbi | 229—55 |
| 2,701,506 | 2/1955 | Gazette | 93—55.1 |
| 2,753,662 | 7/1956 | Behnke | 47—31 XR |
| 2,851,822 | 9/1958 | Fuller | 47—29 |
| 2,989,220 | 6/1961 | Overton | 229—5.7 |

FOREIGN PATENTS

| | | |
|---|---|---|
| 36,499 | 8/1906 | Hungary. |
| 263,991 | 12/1949 | Switzerland. |

ANTONIO F. GUIDA, *Primary Examiner.*

T. GRAHAM CRAVER, ABRAHAM G. STONE,
*Examiners.*

F. B. HENRY, R. L. HOLLISTER,
*Assistant Examiners.*